United States Patent
Blais

(10) Patent No.: US 8,097,280 B2
(45) Date of Patent: *Jan. 17, 2012

(54) FERTILIZER AND METHOD FOR PRODUCING SAME

(75) Inventor: Alexandre Blais, Sainte-Foy (CA)

(73) Assignee: EVL Inc., Laval, Quebec (CA)

( * ) Notice: Subject to any disclaimer, the term of this patent is extended or adjusted under 35 U.S.C. 154(b) by 998 days.

This patent is subject to a terminal disclaimer.

(21) Appl. No.: 10/626,464

(22) Filed: Jul. 24, 2003

(65) Prior Publication Data

US 2005/0020449 A1 Jan. 27, 2005

(51) Int. Cl.
*A61K 9/14* (2006.01)
*C05F 11/08* (2006.01)

(52) U.S. Cl. ............................................. 424/489; 71/8

(58) Field of Classification Search ............ 71/31, 64.03
See application file for complete search history.

(56) References Cited

U.S. PATENT DOCUMENTS

| | | | | | |
|---|---|---|---|---|---|
| 5,071,462 | A | * | 12/1991 | Kimura | 71/7 |
| 5,093,262 | A | * | 3/1992 | Kimura | 435/286.1 |
| 5,853,450 | A | * | 12/1998 | Burnham et al. | 71/9 |
| 6,228,806 | B1 | * | 5/2001 | Mehta | 504/117 |
| 6,841,515 | B2 | * | 1/2005 | Burnham | 504/102 |
| 6,878,179 | B2 | * | 4/2005 | Porubcan | 71/6 |

FOREIGN PATENT DOCUMENTS

| | | | |
|---|---|---|---|
| CA | 2332187 | * | 7/2002 |
| DE | 19523334 | * | 7/1994 |
| DE | 19523334 | * | 1/1996 |
| EP | 1186581 | * | 3/2002 |
| KR | 2001015511 | * | 2/2001 |
| SU | 937436 | * | 6/1982 |

* cited by examiner

*Primary Examiner* — Alton Pryor

(74) *Attorney, Agent, or Firm* — Nixon Peabody LLP; David S. Resnick; Leena H. Karttunen Contarino

(57) ABSTRACT

In accordance with the present invention, there is provided a method for producing an enhanced fertilizer, comprising the step of mixing a granular fertilizer with a ferment comprising active bacteria in a fermentation medium, to obtain an enhanced fertilizer. The ferment is used at a rate of at most 3 liters of ferment per ton of fertilizer. In accordance with the present invention, there is also provided an enhanced fertilizer comprising a fertilizer and bacteria chosen for their specific properties on crops or vegetation.

15 Claims, 1 Drawing Sheet

FERTILIZER AND METHOD FOR PRODUCING SAME

TECHNICAL FIELD

The present invention relates to a new fertilizer. A method for producing same and a method for the treatment of soil and more particularly a method for enhancing the properties of a fertilizer.

BACKGROUND OF THE INVENTION

The use of fertilizers in agriculture is well established and indeed, as fertilizers have been credited with enabling properties, modern society evolves from an agriculture-based society to an industrial society. The art and science of the use of fertilizers is well developed and in modern large scale agriculture, fertilizers are formulated for very specific purposes.

More recently, the role of various microbes in promoting plant growth has come under investigation. It has been found that the supply of certain types of microbes to the soil can have very beneficial results in achieving increased crop yield, increased mineral fertilizer uptake by plants roots, increased organic matter catabolism (and emphasing other beneficial factors to the plants) and also helping to overcome some of the soil depletion which occurs as the result of the use of artificial fertilizers.

Many different types of microbes which are beneficial to the soil are known including, for example, nitrogen fixing bacteria. Nitrogen fixing bacteria can convert or fix the nitrogen directly from the air to a form of organic nitrogen to be thereby provided to the plant for protein synthesis and also enriching the soil around the plants by leaving nitrogen material in the soil for later crops.

To-date, the application of fertilizer and bacteria to the soil have been considered separate operations, as liquid fertilizer and especially nitrogen contained therein is toxic to bacteria in large concentration. The application of fertilizer may be done in a dry form (most common) or by spraying in a liquid form. Similarly, the application of bacterial to the soil has been suggested using a dry dormant bacteria or alternatively, by mixing the bacteria with an inert carrier. Spraying is also practiced under various conditions such as in open field, directed to plants specifically or by injection in the soil.

One of the problems with spraying is that ultraviolet rays can have a deleterious effect on bacteria and thus it is important that the conditions be controlled, as part of the bacteria applied can be washed away by rain. Furthermore, the bacteria are often applied in a dormant state after undergoing a drying operation wherein a lot of cell damage occurs and the bacteria are therefore not at their most active. In fact, before resuming their activity, bacteria have a lag phase necessary to re-initiate the enzymatic systems or to repair the function of enzymatic systems damaged by the treatments imposed on the ferments to dehydrate them or during long conservation time. Most often, the conditions of treatments cause the ferments to only contain spores. The lag time (or lag phase) necessary for the bacteria to resume to their full activity can be up to few hours.

It would be highly desirable to be provided with a new fertilizer that would permit delivery of bacteria and fertilizer in a single step.

SUMMARY OF THE INVENTION

It is an object of the present invention to provide a method for the delivery of bacteria to the soil.

It is a further object of the present invention to provide an enhanced fertilizer product.

It is a further object of the present invention to provide a method for treating a fertilizer product with bacteria so that they may be applied in a single step.

It is a further object of the present invention to provide a method for treating seeds with bacteria.

In accordance with the present invention there is provided a method for producing an enhanced fertilizer, comprising the step of mixing a granular fertilizer with a ferment comprising active bacteria in a fermentation medium, to obtain an enhanced fertilizer, said ferment being used at a rate of at most 3 liters of ferment per ton of fertilizer. The ferment is preferably used at a rate of 0.5 to 2.0 liter of ferment per ton of granular fertilizer. The ferment may be cooled down, such as between 0° C. and 12° C., and more preferably to about 0° C. to 5° C., prior to being mixed with the granular fertilizer.

The ferment of active bacteria may be obtained by fermentation of said bacteria until the end of the exponential growth phase. The fermentation may be allowed to proceed until a concentration of bacteria of at least $10^8$ cells/ml is obtained.

In one embodiment of the invention it may be advantageous that the fermentation medium at the end of the exponential growth phase still contains nutrients for said bacteria. Alternatively, additional fermentation medium may be sprayed on the granular fertilizer.

In one embodiment, the ferment is preferably sprayed onto the granular fertilizer, in which case the bacteria may adhere to the granular fertilizer. In a further embodiment, the ferment is spayed onto a binding agent, which is then mixed with the granular fertilizer. The binding agent may be for example selected from the group consisting of talc, flour, starch, sugar, and powdered milk.

In still a further embodiment, the ferment is subjected to a step of concentration prior to being mixed with the granular fertilizer. The step of concentration may comprise at least one of centrifugation, dia-centrifugation, filtration and dia-filtration.

In accordance with the present invention, there is also provided an enhanced fertilizer comprising:

a) an agglomerate chemical substance containing at least one source of at least one of nitrogen, phosphate and potassium for use as granular fertilizer on crops or soils; and b) bacteria, said bacteria being active upon re-hydration.

The bacteria are preferably sprayed onto the agglomerate chemical substance. The bacteria are also preferably dehydrated prior to getting into a latent stage or prior to sporulation. In one embodiment, the bacteria are coated onto the binding agent To enable the bacteria resuming fermentation upon re-hydration, the enhanced fertilizer may further comprise nutrients for the bacteria.

In accordance with the present invention, there is also provided the use of the fertilizer for fertilizing soils or crops.

For the purpose of the present invention the following terms are defined below.

The term "ferment" is intended to mean a culture medium which has been incubated following inoculation of a bacterial strain to obtain active bacteria. A mix ferment is of that contains more than one bacterial strain.

The term "fertilizer" is intended to mean agglomerated solid particles of chemical substances. The particles may contain any or all of nitrogen (N), phosphate (P) and potassium (K).

The term "active strain" is intended to mean a strain that can reinitiate rapidly fermentation, with no lag phase.

The term "talc" is intended to mean any powder media having a good and fast hygroscopic absorbance power to fix rapidly water.

DETAILED DESCRIPTION OF THE PREFERRED EMBODIMENT

Figure 1:
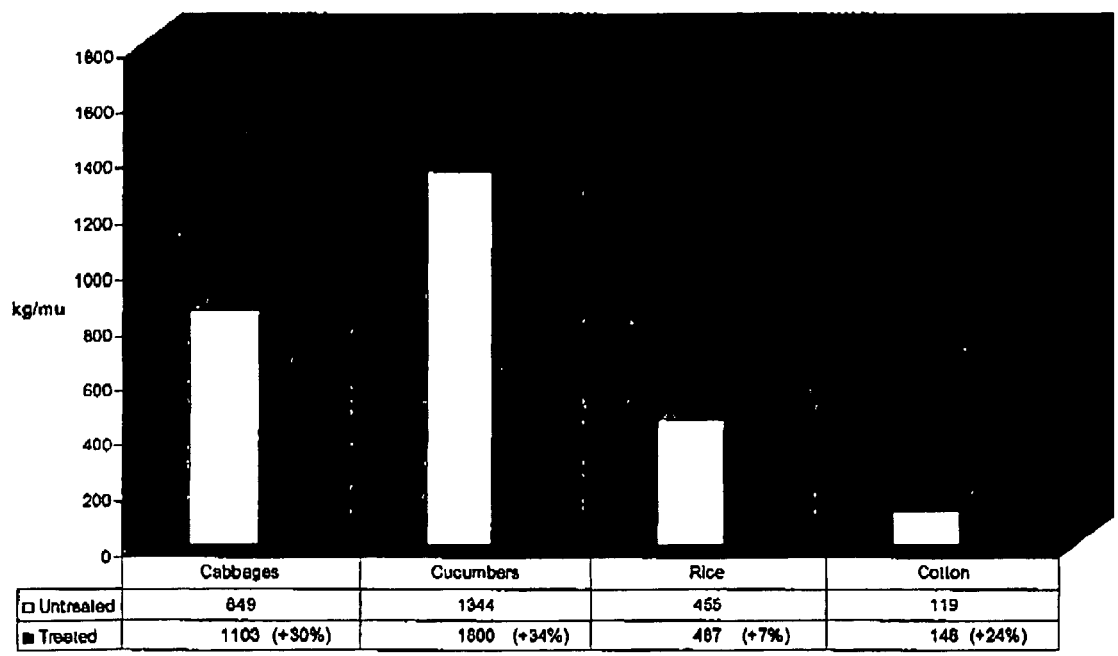
FIG. 1 illustrates yields obtained on various crops treated with either a control fertilizer or with the fertilizer of the present invention.

According to the present invention, desired bacteria, from a mother stock of the same, are subjected to a fermentation process. Typically, the bacterial fermentation process takes place where desired nutrients to permit the growth of the bacteria are supplied. In such a process, there is usually a period of dormancy of up to 2 hours following which there is a period of logarithmic or exponential reproduction until the bacterial population will generally reach an amount of approximately $10^8$ to $10^9$ cells/ml. At such concentration, the bacteria are still in their exponential growth phase, just before their growth plateau stage due to either a slow down in multiplication, a lack of nutrients or an accumulation of toxic fermentation by-products. This is true for most bacteria.

The method of the present invention can be applied to any bacteria, but more preferably to bacteria that can have a beneficial effect on plants or crop growth. As will be seen hereinbelow, the present invention has been illustrated with *Bacillus subtilis*.

After the fermentation has proceeded to a point where the bacterial population is in the range of $10^8$ to $10^9$ cells per ml, it indicates that they are just about to their full maximum potential development. At this point in time, the ferment is then subjected to an action to stop the fermentation. This is preferably achieved by cooling the ferment very rapidly. Preferably, the ferment is brought to a temperature of below 5° C. After rapidly cooling down the ferment, the ferment is preferably sprayed within 72 hours, and more preferably within 48 hours, onto the fertilizer or other absorbing material.

If a higher concentration, higher than $10^8$ to $10^9$ cells per ml, is desired, the ferment can be subjected to dia-centrifigation to increase its concentration to about $10^{10}$ cells per ml.

Fermentation must be stopped rapidly to avoid causing damages to the bacteria so they do not have the need or the time to get into a dormant stage or to form spores. To do so, the fermentation can be cooled down rapidly. The fermentation can also be independently or concurrently sprayed into fine droplets onto an absorbent material to dehydrate the bacteria very rapidly such that multiplication is not possible anymore. When the fermentation is being sprayed, the step of cooling down is optional as in both cases, i.e. the cooling down or the spraying, the fermentation is stopped rapidly. Alternatively, dia-filtration or rapid centrifugation in buffered medium may be done. Furthermore, one skilled in the art could also think of a rapid cryogenic method with cryo-protectants, where sublimation following the cryogenization of a liquid phase would mimic a pseudo-lyophilization. The bacteria so dried may then be re-hydrated just prior to being sprayed on the fertilizer. All these other techniques are aimed at preventing bacterial stress causing sporulation or the bacteria to enter in a dormant stage, so they remain fully active and functional upon re-hydratation, without any lag time.

At this point in time, in one embodiment, the ferment is then sprayed on a solid fertilizer particle such that the bacteria will adhere to the fertilizer particle. The fertilizer particle, being relatively dry, will absorb the bacterial particle and the moisture will be dispersed throughout and the bacteria will remain in a latent stable state. The ferment should not however be sprayed on the fertilizer at a higher rate than 2.5 to 3.0 l/tons of fertilizer. Spraying at a higher rate will cause the fertilizer to partly solubilize, liberating nitrogen concentrated at the surface of the fertilizer, in the vicinity of the bacteria, which is toxic to the bacteria in such concentrated microenvironment. Preferably, the ferment is sprayed at a rate of 0.5 to 2.0 l/ton, and most preferably at 2.0 l/ton on the fertilizer.

In a further and different aspect of the present invention the ferment may be sprayed on a seed particle. In lieu of spraying, the ferment may also be applied by means of a binding agent such as starch or talc, or any other suitable product which would function to bind the bacteria to the seed product. Powdered milk is particularly well suited for such application. In tact, any dry powder, such as talc, flour, sugars, starch or powdered milk, can be supplemented with a binding agent such as oil or milk fat for example to enable the dry powder to bind bacteria and the fertilizer. The dry powder that can be used in accordance with the present invention are thus those that can absorb by contact humidity, that are non-toxic to the bacteria and that may act as a binder.

In the above process, the fertilizer may be any desired. As aforementioned, the fertilizer product absorbs the excess moisture and to this end, the fertilizer may be formulated to have this capability. Naturally, the fertilizer product will normally have a volume at least several times larger than the particle of liquid ferment. In other words, the liquid ferment is essentially atomized and sprayed onto the fertilizer product with the moisture being absorbed over the whole of the fertilizer product and thus dehydrating the bacteria and rendering those into a latent stable state while still being relatively healthy with little cell damage. As such, the bacteria then remain stable and active and ready to resume their activity under the proper conditions of re-hydration in the soil.

In one particular embodiment the concentration of the nutritive element in the ferment may be adjusted such that there remains in the ferment, at the moment where fermentation is stopped, a certain quantity of a nutrient material. This nutritive material with the microbes will then be sprayed on the fertilizer particle. When the fertilizer particle is hydrated in the soil, the bacteria or microbe will then resume its activity and this under desirable conditions where the nutritive material is readily available. Naturally, the nutritive material is also available for use in the soil.

The particular type of bacteria or microbe which may be used with the present invention may be any known desirable type of bacteria which can successfully undergo the above treatment. Such known bacteria include nitrogen fixing bacteria, microbes used in soil bioremediation, microbes used in the dairy industry, etc.

The nutritive material in the fermentation approach can be selected from any number of known materials including different milk, any ingredients normally used and recognized in fermented media for fermentation purpose of any microbial culture, including synthetics media, or animal and fish by products as well as sugars and the like.

One advantage of the above process is the fact that the microbes are in a healthy state when applied to the fertilizer and have not undergone any other process which could weaken the cells such as by various other forms of drying or the like.

Another advantage is that the bacteria once sprayed on the fertilizer are ready to resume their growth and/or activity upon application. There is no lag time as there was with the method of the prior art.

A further advantage of the present invention is to provide a method for the delivery of bacteria to the soil, precisely on or close to where the fertilizer particles are in the soil, preventing dispersion of the bacteria in the total mass of soil, and having a locally increased concentration of bacterial cells in close proximity to the fertilizer particles.

In one embodiment, the above process provides the possibility of utilizing a plurality of spraying steps to spray the fertilizer with the bacteria. In this respect, one could use two or more different types of bacteria, each selected for their known enzymatic or functional properties for producing interesting results on the soil. This possibility thus permits one to have two different fermentation processes under different fermentation conditions. Thus, as known in the art, there are different parameters for different types of microbes and one could thus run first and second fermentation processes under different conditions while spraying the fertilizer particles sequentially, or together. When two ferments are used, the two ferments can be sprayed independently of jointly, in which case, they are preferably mixed together just prior to spraying on the fertilizer.

For the application to the soil, conventional equipment may be used and thus expenses are minimized and the process is accomplished in a single operation further saving money.

As aforementioned, it is also highly advantageous that the microbes are applied to the soil in a good condition and ready to resume growth (no lag time) when the soil is hydrated.

The bacterial product was applied successfully on a variety of products including rice, cucumbers, celery, soy, potatoes, evergreens, hay, corn, poinsettia plants, etc. All of the above plants exhibited better growth, more leaf, and a more developed root system.

In the invention, one preferably utilizes ferments in order to obtain fully active cultures. Such ferments are blocked by cold or other means so as to retain their full activity at the top of their growth chart. The ferments are then vaporized onto dry fertilizer particles which, depending on their respective proportions, will permit a very fast dehydration of droplets of the ferments so that the viability and activity of the ferments are kept intact, thus allowing them to reactivate themselves very rapidly when they are re-hydrated again without having to go through all the steps of reactivation of their metabolism, the microbes having kept their almost integral activity such as at the end of their fermentation.

The fertilizer particles are a favorable environment to catch the humidity of the ferment droplets rapidly, however there are other granular or powder products available which can do the same thing. Examples are talc, sugars, flours and any other absorbent material such as commercial absorbent products capable of dehydrating ferment droplets very quickly and make it so that the final hydration of the mixture is such that the residual humidity does not allow any growth or even any metabolic activity up until the resulting product comes into contact again with sufficient humidity as to start up the metabolism again. Such talc, sugars, flours and other absorbent materials can be mixed with the fertilizer to adhere thereto.

The applications are numerous since by choosing granular or powder absorbent products having adhesive properties, powders or particles may be enriched by concentrated ferments obtained by neutralization or concentration processes such as ultrafiltration or the like and finally mixed, for example, to fertilizers or seeds. This process may be applied to fertilizers simply by using mechanical mixers and the ferment enriched powders may be produced in a central point separate from fertilizer plants. This lowers investment needs. Furthermore, each of the ferment constituents of a mix may be reproduced separately and then, after having controlled their concentration, may be mixed together with precision. This modified technology may apply to compost and any material utilized in agriculture. For example, the method of the present invention can be used for coating seeds with microorganism, if so desired.

In order to prove that active bacteria coupled to the fertilizer in accordance with the present invention are indeed found in the soil, the inventor has used a bacterial species easily detectable and very sensible to toxic chemical, i.e. *Lactobacillus acidophilus*. With traditional methodology for treated soils, it is not possible to confirm any increase in the number of bacteria in the soil, the methodology for counting not being sensitive enough. However, using a bacterial strain detectable by its biochemical properties, and by perfusion of the soil in a large volume of buffer that is subsequently filtered, it was possible to trace back the *Lactobacillus* only in treated soil (not in control untreated soil).

To prove that the bacteria sprayed on the fertilizer were viable, the coated fertilizer (50 gr) was solubilized in 40 liters of sterile phosphate buffer. The solubilized fertilizer was then subjected to ultrafiltration using a second 40 liters of phosphate buffer. The filtrate has then been incubated on LBS and MRS. The results were positive. The fertilizer of the present invention did show the presence of living *lactobacillus*.

It will be understood that the above described embodiment is for purposes of illustration only and that changes and modifications may be made thereto without departing from the spirit and scope of the invention.

The present invention will be more readily understood by referring to the following examples which are given to illustrate the invention rather than to limit its scope.

Example I

*Bacillus subtills*-Coated Fertilizer

*Bacillus subtilis* has been fermented in a fermentor until a count of $10^8$ cells/ml was obtained, under standard culture conditions for the strain. The strain was grown on a base of reconstituted milk (12%) enriched with 5% sucrose. The fermentation was allowed to proceed until the desired concentration was obtained as determined by standard agar plate count. Once at the desired concentration, the ferment was cooled down to 5° C. in ice-cold water. The ferment was used at a ratio of 2 liters of ferment to be sprayed on one ton of granular fertilizer. The granular fertilizer was chosen for its nitrogen (N), phosphate (P) and potassium (K) content adapted to the time of use and to the type of culture for which it is intended to be used. For cabbages, the granular fertilizer had an N—P—K formulation of 17-7-12. For cucumber, the granular fertilizer had an N—P—K formulation of 18-7-12. For rice, the granular fertilizer had an N—P—K formulation of 18-7-12. Finally, for cotton, the granular fertilizer had an N—P—K formulation of 15-15-15.

Example II

Effect of the Fertilizer on Various Crops

Assays were conducted in China on cabbages, cucumbers, rice and cotton. Assays were conducted in parallel in control crop fields and in treated crop fields. In fields of cotton, 50 kg/mu of either the fertilizer alone or the fertilizer containing *B. subtilis* adhered thereto (as detailed in example 1, referred herein as the fertilizer of the present invention) was used. Mu is a Chinese unit of surface equal to about ⅙ of acre. For the cucumber crops, either 20 kg/mu of fertilizer alone or 13 kg/mu of the fertilizer of the present invention was used. For cucumber, 20% of the above mentioned amount of either fertilizers were used at the beginning, 10% of it was used between the appearance of the $3^{rd}$ to $5^{th}$ leaf, 15% was used between the appearance of the $5^{th}$ to $8^{th}$ leaf, 15% was used at blossoming, 20% was used upon fruit production, and finally twice 15% was used thereafter.

For the rice crop, 30% of the above-mentioned amount of either fertilizers was used at the beginning, 25% was used between the $7^{th}$ and $10^{th}$ days after transplantation, 15% was used between the $18^{th}$ and $20^{th}$ day post transplantation, 15% was used between the $30^{th}$ and $35^{th}$ day post transplantation and 15% was used at the first stage of differentiation of the ear.

For the cabbage crop, 20% of the above-mentioned amount of either fertilizers was used at the beginning, followed by 5 applications of 10%, 15%, 20%, 20% and 15%, each spaced apart from the previous one by 7 days.

As illustrated in FIG. 1, the fertilizer of the present invention had a significant effect of the yields obtained on the different crops. More particularly, the fertilizer of the present invention allowed to obtain a 30% increase in the yield of cabbage, when treated with the fertilizer or the present invention, as compared to the control crop that was simply treated with the fertilizer alone, without B. subtilis. The fertilizer of the present invention also increase the yields of cucumbers, rice and cotton by 34%, 7% and 24% respectively.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A method for producing a fertilizer, comprising the step of
    (a) obtaining a ferment from fermentation of bacteria wherein the fermentation is stopped before bacteria get into dormant stage in a fermentation medium, said bacterial having no lag time upon re-hydration; and
    (b) spraying the ferment comprising active bacteria onto a granular fertilizer, said ferment being used at a rate of at most 3 liters of ferment per ton of fertilizer.

2. The method of claim 1, wherein the ferment is used at a rate of 0.5 to 2.0 liter of ferment per ton of granular fertilizer.

3. The method of claim 1, wherein the ferment is cooled down prior to being mixed with the granular fertilizer.

4. The method of claim 3, wherein the ferment is cooled down to about 0° C. to 12° C.

5. The method of claim 4, wherein the ferment is cooled down to about 0° C. to 5° C.

6. The method of claim 1, wherein the ferment of active bacteria is obtained by the fermentation of said bacteria until the end of the exponential growth phase.

7. The method of claim 6, wherein the fermentation is allowed to proceed until a concentration of bacteria of at least $10^8$ cells/ml is obtained.

8. The method of claim 6, wherein the fermentation medium at the end of the exponential growth phase contains nutrients for said bacteria.

9. The method of claim 1, wherein additional fermentation medium is sprayed onto the granular fertilizer.

10. The method of claim 1, wherein the bacteria adheres to the granular fertilizer.

11. The method of claim 1, wherein the ferment is spayed onto a binding agent, said binding agent being thereafter mixed with the granular fertilizer.

12. The method of claim 11, wherein the binding agent is selected from the group consisting of talc, flour, starch, sugar, and powdered milk.

13. The method of claim 1, wherein the ferment is subjected to a step of concentration prior to being mixed with the granular fertilizer.

14. The method of claim 13, wherein the step of concentration comprises at least one of centrifugation, dia-centrifugation, filtration and dia-filtration.

15. A method of producing a bacteria and fertilizer composition comprising:
    providing a granular fertilizer;
    providing a bacterial ferment obtained from fermentation of bacteria in fermentation medium and the ferment stopped prior to the bacteria entering a dormant stage, said ferment comprising active bacteria having no lag time upon re-hydration; and
    spraying the bacterial ferment onto the granular fertilizer at a rate of less than 3 liters bacterial ferment per ton of granular fertilizer thereby producing a bacteria and fertilizer composition.

* * * * *